United States Patent [19]

Bolick, Jr.

[11] 3,827,079

[45] July 30, 1974

[54] TRANSCRIBER DICTATION INDEXING APPARATUS

[75] Inventor: Fred C. Bolick, Jr., Atlanta, Ga.

[73] Assignee: Lanier Electronic Laboratory, Inc., Atlanta, Ga.

[22] Filed: Oct. 8, 1971

[21] Appl. No.: 187,640

[52] U.S. Cl. .................................... 360/79, 360/72

[51] Int. Cl. ...................... G11b 23/42, G11b 31/00

[58] Field of Search .... 179/100.25 R; 346/111 DM; 352/20, 23, 24, 170, 172; 274/4 R, 1 R, 11 R

[56] References Cited

UNITED STATES PATENTS

| | | | |
|---|---|---|---|
| 2,677,728 | 5/1954 | Kolb et al. | 179/100.2 B |
| 2,976,372 | 3/1961 | Sampson | 179/100.2 E |
| 3,203,000 | 8/1965 | Dollenmayer | 346/111 DM |
| 3,470,777 | 10/1969 | Flubacker | 179/100.2 R |
| 3,644,683 | 2/1972 | Braun | 179/100.25 |

*Primary Examiner*—Harry N. Haroian

*Attorney, Agent, or Firm*—Jones, Thomas & Askew

[57] ABSTRACT

Apparatus providing indexing of transcribed information recorded on a recording medium. Information denoting end of dictated message, special instructions of the dictator, or other details, is recorded directly on the recording medium rather than being marked on a separate index member by the dictator. An index member not requiring predetermined beginning and end indications is traversed by transcription apparatus concurrently with a traverse of the tape or other recording medium, and a visual indication is applied to the index member corresponding to each element of information previously recorded by the dictator. When this preparation of the index member by the transcriber has been completed, a reference mark is positioned adjacent the index member mark which indicates the beginning of dictation to be transcribed; the index member then moves relative to the indicating mark as transcription progresses to indicate the transcription relative to the previously-prepared index member.

16 Claims, 9 Drawing Figures

INVENTOR
FRED C. BOLICK, JR.

BY Jones & Thomas
ATTORNEYS

INVENTOR
FRED C. BOLICK, JR.

BY Jones & Thomas
ATTORNEYS

TRANSCRIBER DICTATION INDEXING APPARATUS

This invention relates in general to dictation apparatus and in particular to dictation indexing apparatus.

Those skilled in the design or use of dictation and transcription equipment are aware that such equipment employs a suitable recording medium such as magnetic tape, magnetic belts, mechanically grooved discs or belts, or other expedients to record dictated letters, messages, or the like. Since the material being dictated almost invariably pertains to messages or correspondence which do not require equal dictation time, it is desirable to provide some apparatus for providing a written record of message length so that the transcriber, that is, the person who plays back and types the recorded information, can be advised of the approximate message length prior to commencing the actual transcription of each message. Furthermore, it is frequently desired by persons using dictation equipment that they be able to dictate special instructions on the recording medium and be able to have the transcriber made aware of such special instructions, which may be contained in the middle of a passage of recording medium, at the outset of transcription so that the transcriber may immediately play back the passage or passages containing special instructions.

Although many prior art expedients have been proposed to enable an indexed permanent record to be made of the messages and the special instructions of a dictator, such expedients require that a paper or other record medium be inserted in the dictation apparatus and marked as by perforating, printing, or the like to indicate each message termination or special instruction in response to the dictator's manipulation of the appropriate control on his machine. Other prior expedients simply provide an index counter on the dictation apparatus so that the dictator is required to note on a separate slip of paper the index position corresponding to message terminations and special instructions. The slips of paper or other index member then must be given to the transcriber along with the specific tape, belt, or other recording medium associated with that index member. If the index member becomes separated from the corresponding recording medium or otherwise becomes lost or misidentified in the course of handling, the transcriber has no way of determining the number of previously dictated messages or special instructions unless, of course, she takes the time necessary to play back the entire recording prior to commencing actual transcription thereof.

Accordingly, it is an object of the present invention to provide improved dictation indexing apparatus.

It is another object of the present invention to provide dictation transcription apparatus having improved message indexing features.

It is a further object of the present invention to provide dictation transcription apparatus usable with dictation wherein special event indicia such as message and instruction information are recorded on the same medium as the dictation.

It is still another object of the present invention to provide dictation transcription apparatus which prepares an index number in response to the output of a previously recorded dictating medium.

Other objects as well as many of the attendant advantages of the present invention will become more readily apparent from the present description of an embodiment of the invention wherein.

Figures 1, 2, 4:
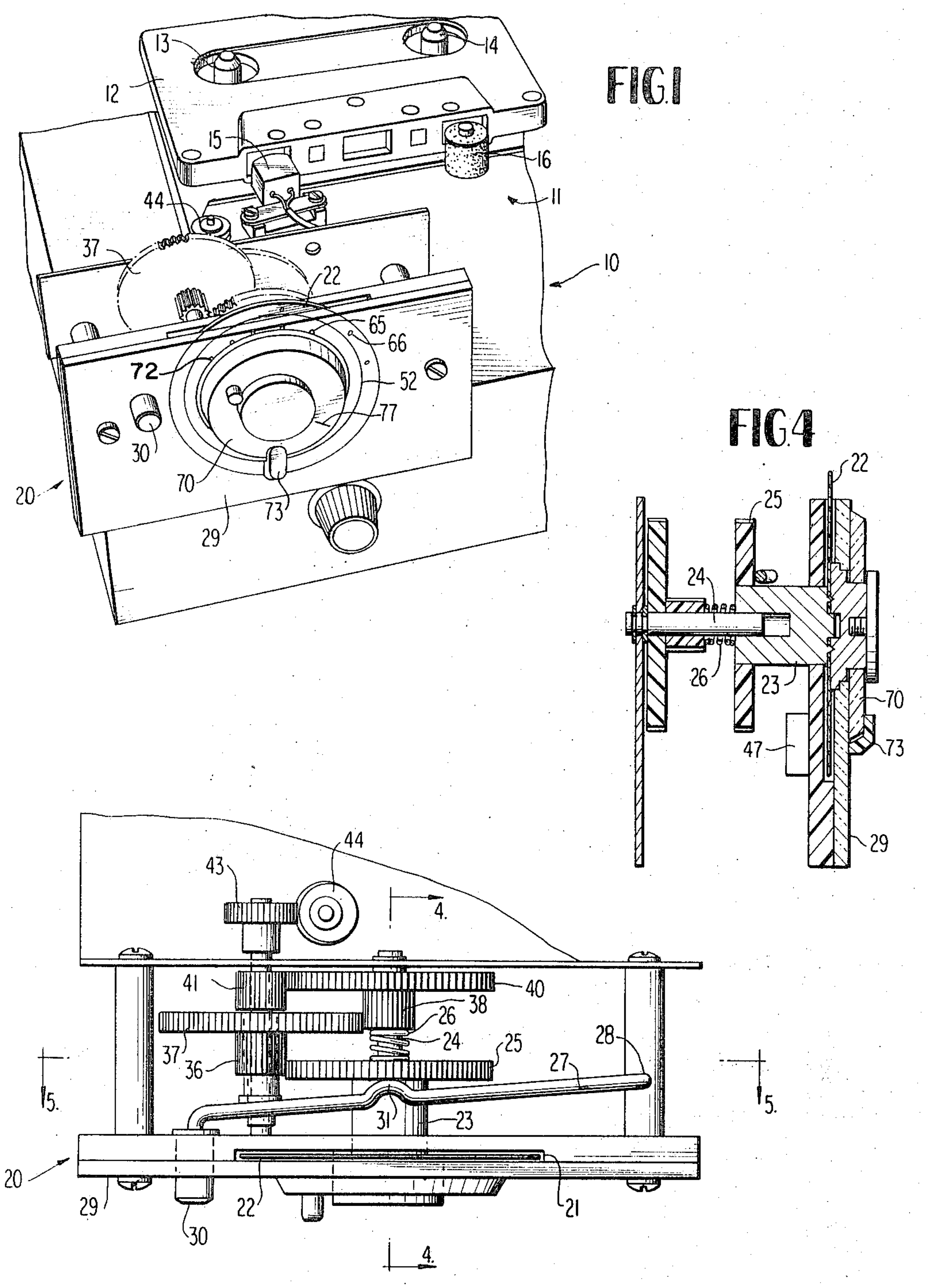
FIG. 1 shows a partial pictorial view of transcription apparatus including an embodiment of the present invention.
FIG. 2 shows a detailed view of the index member drive mechanism including an index member, of the embodiment depicted in FIG. 1.
FIG. 4 shows a section view taken along line 4—4 of FIG. 2.

The dictation transcription apparatus of the present invention accepts recorded dictation which includes one or more indicia recorded thereon by the dictator and indicating some particular event such as the end of a message or a special instruction to the transcriber. When the recording medium, such as a quantity of magnetic tape contained in a recording cassette, for example, is operated in reverse direction to be rewound on the transcribing apparatus prior to the commencement of actual transcription, an unmarked index member is moved by the transcribing apparatus in a direction reverse of the normal index member movement and the special event information previously recorded on the recording medium is sensed by the transcribing apparatus to cause a corresponding mark or marks to be made on the indexing member. Once the recording medium rewinding has been completed to place this medium at its initial position to commence transcription playback, a suitable datum member on one embodiment of the present invention is adjusted to the point on the indexing member corresponding to the end of recording medium rewind. This point constitutes the beginning of the index member, and the marks previously made on the index member during rewind denote various places along the length of the recording medium where special information or end-of-message signals are located. On another embodiment of the present invention, a fixed datum is provided on the transcription apparatus. Since the index member is marked by the transcription apparatus according to the present invention, precision positioning of an index member previously marked during dictation is not necessary according to the present invention.

More particularly and with reference taken to the embodiment depicted in FIGS. 1–5, there is shown generally at 10 a dictation transcribing apparatus including a suitable tape transport mechanism 11 for receiving a conventional recording tape cassette 12. A pair of drive shafts 13 and 14 are provided on the transcribing apparatus for operating the individual tape reels of the cassette, and a playback head 15 and a tape idler wheel 16 are additionally provided for selective engagement with the tape. Further details of the tape drive, including mechanisms for tape fast forward, tape rewind, and the like are not shown herein inasmuch as such details are well known to those skilled in the art of tape recorders in general and of transcription apparatus in particular.

The indexing apparatus 20 includes a receptacle 21 for receiving a suitable index member 22 onto which the various instruction or end-message marks will be placed in a manner to be described below. The index member 22 comprises a circular disc of markable material which is engaged for rotation by a hub 23 slideably mounted for rotation on a shaft 24. The hub 23, which is connected to be rotationally driven by gear 25, is normally biased into engagement with the indexing member 22 by a resilient member such as the compression spring 26. A retraction lever 27 pivotally mounted as at 28 and having a free end extending through the panel 29 or otherwise in contact with a disengaging member 30 is provided having an abutment portion 31 which is disposed adjacent one side of the gear 25. The hub 23 is normally biased by the spring 26 to contact an index member received within the receptacle 21, and one or more teeth or other index member engaging elements may be provided on the radial surface of the hub 23 for engaging the index member to facilitate the rotation thereof. When the disengaging member 30 is depressed inwardly toward the panel 29, however, contact of the abutment portion 31 with the gear 25 forces this gear and the hub 23 rearwardly against the force of the spring 26 thereby withdrawing the hub from the indexing member 22 so that such member can be removed and replaced if desired with another indexing member.

The gear 25 is driven for rotation by a gear train including a second gear 36 connected to be driven by a third gear 37, which in turn is driven by a fourth gear 38 mounted for rotation independent of the shaft on which the hub 23 and the gear 25 are slideably mounted. The fourth gear 38, in turn, is connected for rotation by a fifth gear 40 which engages a sixth gear 41 mounted to be driven by gear 43 which engages a worm gear 44 connected for rotation by the tape transport mechanism.

The specific details of the mechanical interconnection between the worm gear 44 and the tape drive mechanism are unimportant per se, provided that rotation of the worm gear 44 by the tape transport mechanism corresponds to movement of the tape from one reel of the cassette 12 to the other reel thereof. Accordingly, the worm gear 44 may be mechanically interconnected to the drive mechanism for either of the shafts 13 and 14. Similarly, the arrangement of gears 36, 37, 38, 40, and 41 is used on the present embodiment to reduce the rotational speed of the gear 44 to a speed which preferably enables no more than one revolution of the hub 23, and thus of an index member 22 driven by the hub, to be made for a complete traversal from beginning to end of the tape contained in the cassette 12. It will be understood, of course, that different arrangments of reduction gears or other appropriate drive mechanisms may be used as necessary or appropriate to operate the index member at the appropriate speed relative to the duration of the recording medium being used in a particular transcription apparatus.

Figure 9:
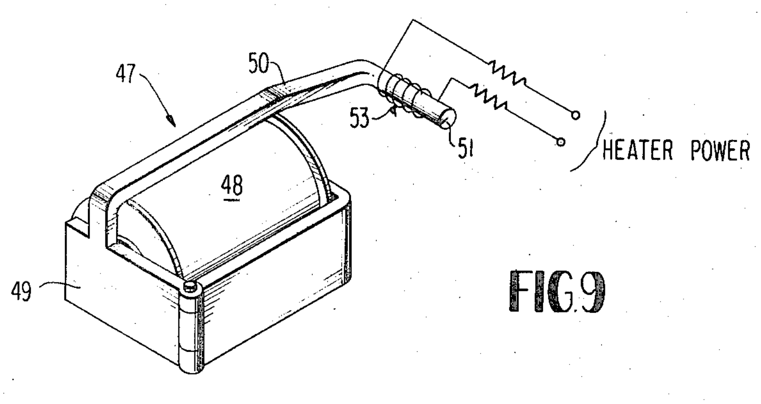
FIG. 9 shows a pictorial view of an embodiment of one of the marking devices used in the present invention.

A pair of separate index member marking devices 46 and 47 are provided on the inner side of the panel 29 or are otherwise positioned to be in marking proximity to a surface of an index member 22 contained in the receptacle 21. Each of the marking devices 46 and 47 in the described embodiments comprises a heating device which selectively applies heat to a localized area of the index member 22 upon application of the appropriate signal to the marking device. An exemplary marking device 47, as more clearly shown in FIG. 9, includes a solenoid coil 48 operative when energized to attract an armature 49. Upon energizing of the solenoid coil 48 and movement of the armature 49, an arm 50 connected to the armature is moved toward the index member receptacle 21 to place the tip 51 of the arm in contact with an index member 22 disposed within the receptacle. A resistance heater 53 disposed on the arm 50 adjacent the tip 51 and connected to a suitable source of heater power maintains the tip 51 at an elevated temperature which, when used in conjunction with an index member 22 made of a suitable thermosensitive material which exhibits a rapid color change in response to the application of heat, causes a marking spot or dot to appear on the index member as a result of heated tip 51 momentarily contacting the index member. It will be understood by those skilled in the art that the use of a thermal marking device as described herein is by way of example only and that other appropriate marking expedients, such as paper perforators or the like, may be used in place of the aforementioned combination of thermal marking devices and thermosensitive index members. For example, the tip 51 and the heating element 53 disposed thereon could be replaced by a pointed element which would puncture a thin paper index member disposed in the receptacle 21.

A detailed view of an exemplary index member 22 received in the receptacle 21 is shown in FIG. 1. At least the portion of the panel 29 surrounding the index member 22 is made of a transparent material or is otherwise clear so that substantially the entire periphery of the index member is visible. Although the index member 22 may advantageously have a circular time line 52 preprinted thereon for a purpose described below, it will be noted that the index member need contain no additional printed indicia such as "tape beginning," "tape end," periodic spacing marks, or the like as generally contained on indexing members heretofore used with transcribing apparatus of the prior art. An index wheel 70 having a suitable index or datum mark 77 disposed thereon is mounted on the panel 29 to be coaxial with the hub 23 and to be manually rotatable independently of the rotation of the hub 23 and an index member 22. A member 73 affixed to the panel 29 and frictionally engaging the index wheel 70 prevents unwanted rotation of the index wheel.

The dictation transcription apparatus of the present invention is advantageously usable in the transcription of dictation which has been recorded on suitable apparatus of the type which also places on the recording medium signals which correspond to the end of each recorded message, each such signal being referred to as an "end signal," and/or signals corresponding to the location on the recording medium of a particular instruction to be noted by the transcriber, each such signal being referred to as an "instruction signal." One such dictation apparatus for placing end signals and instruction signals on a recording medium such as a magnetic tape is described in detail in U.S. Pat. application Ser. No. 149,480, filed June 3, 1971 and entitled "Dictation-Transcription Method and System," and assigned to the same assignee as the present invention.

Figure 3:
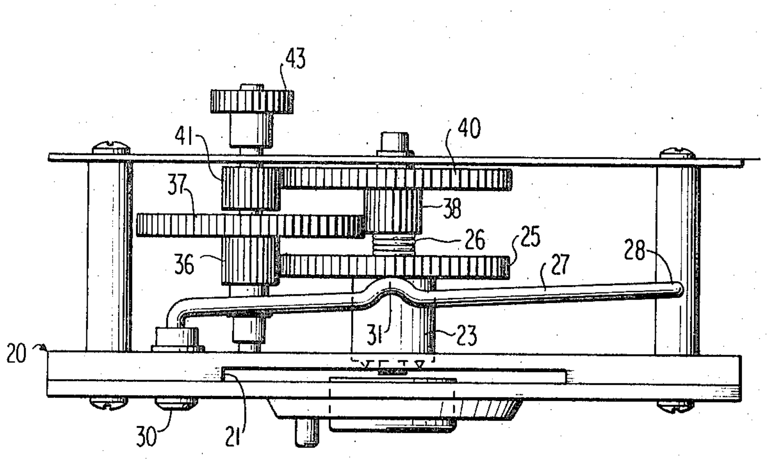
FIG. 3 shows a further detail the drive apparatus for the index member in the embodiment of FIG. 1.
Figure 6:
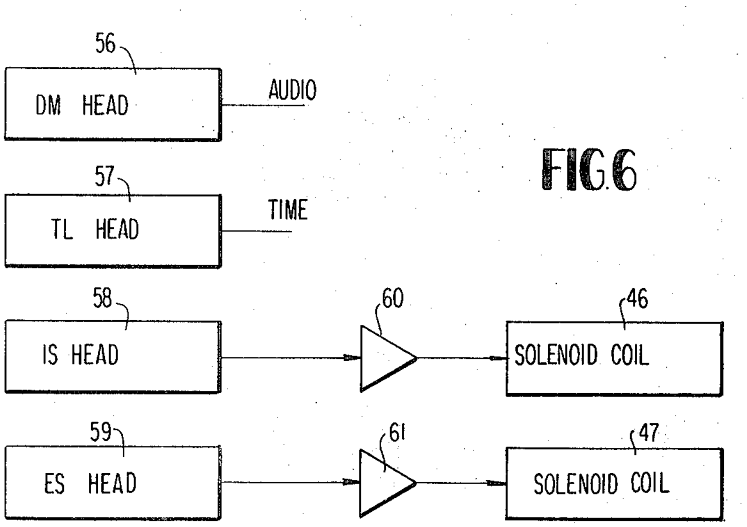
FIG. 6 shows a schematic representation of marking control operation according to an embodiment of the present invention.

It can be seen from reference to the foregoing patent application that the end signal and instruction signal information can be applied to the recording medium by a number of expedients, such as by providing a separate track of the recording medium for each such signal in addition to a time line signal; by superimposing the instruction signals and end signals on a separate channel; or by superimposing the end signal on the channel containing the dictated message, either separately or in coincidence with the interruption of the time line signal contained on an adjacent channel of the recording medium. Assuming for the purpose of explanation that a recording arrangement as shown in FIG. 3 of the above-referenced copending application is used, wherein a separate channel of the recording medium is provided for each separate class of information, FIG. 6 herein provides a schematic showing of exemplary apparatus for operating the marking devices 46 and 47 from the information contained on such a recording. In a manner known to those skilled in the recording art, a separate playback head is provided for each of the four channels recorded on the magnetic tape, it being understood that the playback head 15 depicted in FIG. 1 would actually comprise four separate heads properly aligned with respect to the several tracks of the tape. The dictated message playback head 56, or "DM head," which is positioned to be adjacent the tape channel containing the audio dictated message, is connected to suitable audio circuitry (not shown); and the time line head or "TL head" 57, which is positioned to be adjacent the tape channel containing a time line or time base signal, similarly is connected to circuitry which is not shown and which forms no part of the present invention. The "IS head" 58 and the "ES head" 59 are positioned to be respectively adjacent the tape channels on which instruction signals and end signals, if any, have been previously recorded by a dictator.

Signals received by the information signal head 58 are applied to suitable circuitry including an amplifier 60 to provide a signal of amplitude and duration sufficient for energizing the solenoid coil of the marking device 46 to place the heated tip 51*a* controlled by that coil into momentary contact with the index member 22. In a similar manner, the output from the end signal head 59 is applied through amplifier 61 to the solenoid coil 48 of the end signal marking device 47 to cause the heated tip 51 associated therewith to selectively move into thermal marking engagement with the index member 22. Since the information signals and the end signals contained on the dictated tape may be of momentary duration less than the time required to actuate the respective solenoid coils for the time required to properly mark the index member, suitable holding or time delay circuitry may be provided as necessary or appropriate to enable the respective solenoid coils of the marking devices to be held actuated in response to an appropriate pulse from the playback heads 58 and 59.

In the disclosed embodiments of the present invention, the heating elements associated with the marking devices 46 and 47 are energized continuously during the index member marking operation of the apparatus, for example, during the entire "rewind" phase of operation as described below. This continuous energization of the heating elements permits more rapid and precise marking of the index member, since the thermal inertia associated with conventional resistance heating elements need not be overcome for each individual mark applied to the index member.

Figure 5:
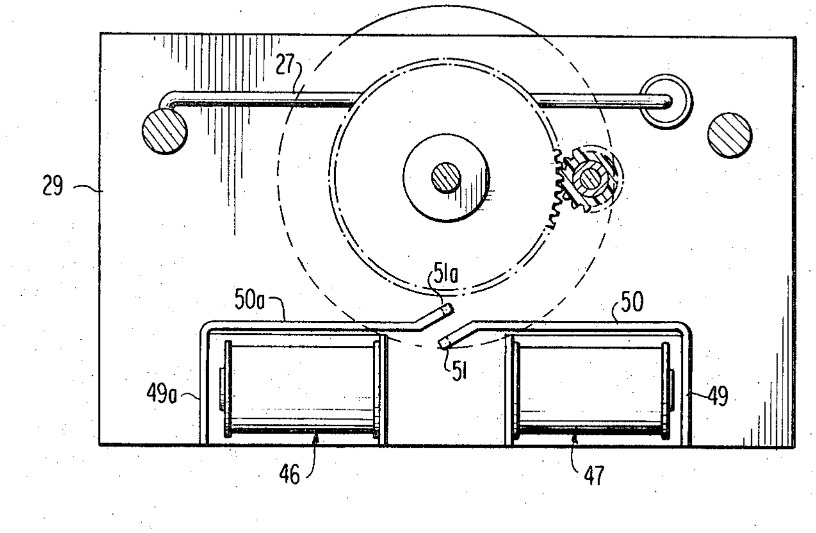
FIG. 5 shows a partial rear elevation view of the index member drive mechanism of the embodiment of FIG. 1 including the index member marking devices.

It will be appreciated that the marking devices 46 and 47 are disposed to apply heat to the index member 22 at different radial locations along a given circumferential position of the index member 22, this being accomplished as depicted in FIG. 5 by way of the different radial locations of the tips 51 and 51*a* relative to the axis of rotation of the hub 23 driving the index member. The results of such marking is depicted in FIG. 1, wherein the output from the marking device 46 is applied inside a time line 52, which may be preprinted on the index member 22, to produce end signal indicia 65 at various locations around the circumference of the index member as described below. Similarly the information signal marking device 47 is positioned to produce information signal indicia 66 at selected locations outside of the circumferential time line 52.

Considering now the operation of the present transcription apparatus in the transcription of a previously recorded tape which includes various end signal and information signal indicia at locations thereon unknown to the transcriber, a transcriber places the tape cassette 12 into the transcribing apparatus and also places an unmarked index member 22 into the receptacle 21. Since the apparatus of the present invention causes the index member to receive a mark corresponding to the commencement of dictation, no preprinted indices or the like are required on the index member 22. Moreover, placing the index member 22 into the receptacle 21 calls for no particular orientation of the index member relative to a datum line, since no marking is yet on the index member.

The recording tape in the cassette, which has been furnished to the transcriber as previously recorded by the dictator without having been rewound, now is rewound by the present apparatus preferably operating in a fast-rewind mode. During rewinding, the information signal head 58 and the end signal head 59 are operative to respond to any information signals and end signals previously recorded on the corresponding channels of the tape. As either an end signal or an information signal is sensed by the corresponding heads, the appropriate marking device 46 or 47 is actuated to apply a corresponding mark to the index member 22 which is being driven in a "reverse" direction corresponding to the rewinding of the tape. After rewinding of the tape has been completed, the operator of the transcribing apparatus then manually adjusts the index wheel 70 to align the datum line 77 with the last end mark, shown on the drawing at 72, which was applied to the index member 22 during rewinding of the tape and which corresponds to the first end signal applied to the tape by the dictator upon the commencement of dictation. This end signal 72 thus designates the beginning of the dictation contained on the tape and is used during the entire transcription of that tape as the starting reference point for the index member. At this time the transcriber can see from the several end signal indicia 65 the location and approximate duration of the messages contained on the tape, and can also see from the presence and location of any information signal indicia 66 whether the tape contains special information which should be transcribed immediately. As transcription of the recorded messages progresses, the index member 22 is moved in a "forward" direction corresponding with the forward movement of the tape so that the various marks 65 and 66 on the indexing member will sequentially move past the stationary datum line 77. The frictionally engaging member 73 prevents movement of the index wheel 70 during rotation of the index member 22.

It will be appreciated that the circuitry shown schematically on FIG. 5 hereof will not be exactly appropriate for the index message playback of tapes or other recording media prepared according to certain of the embodiments described in the aforementioned copending application, wherein the end signals are superimposed upon the dictated material or upon other signals such as the time line or the like. In that event, the number of playback heads will be correspondingly reduced and additional circuitry will be provided using band-pass filters or other expedients known to those skilled in the art to separate the end signals and information signals for application to the appropriate marking device. If an end signal indication is provided by the coincidental occurrence of an end signal superimposed on the dictated material and the interruption of the time line signal on an adjacent tape channel, then the circuitry associated with the present invention will require a suitable coincidence circuit to permit the end signal marking device 51 to be actuated only upon the coincidence of an end signal being received and an interruption in the time line signal also being received. The design and construction of circuits having the functional and operational characteristics described herein are within the abilities of one of ordinary skill in the art, and so the specific details of such circuits are not recited herein.

Figure 7:
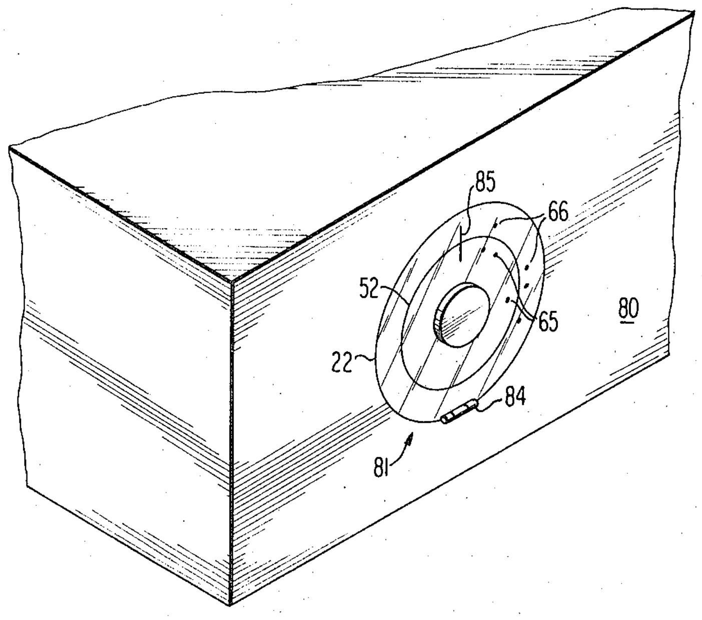
FIG. 7 shows a pictorial view of transcription apparatus according to another embodiment of the present invention.
Figure 8:
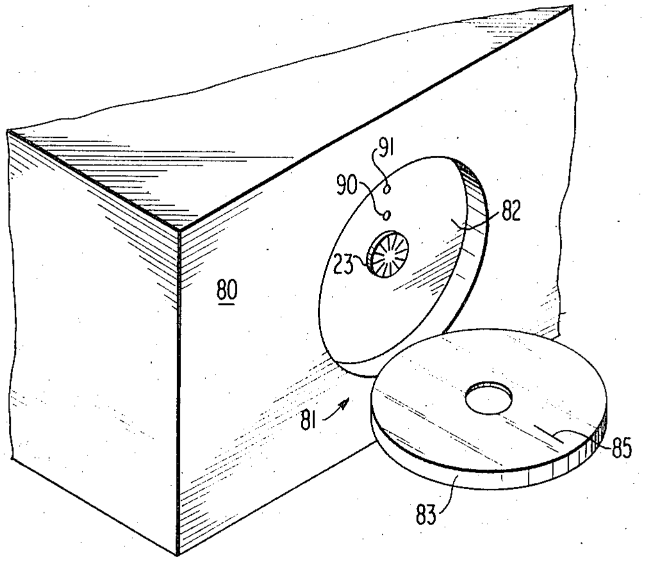
FIG. 8 shows a partial pictorial view of the embodiment depicted in FIG. 7.

Another embodiment of the present invention is depicted in FIGS. 7 and 8 and differs from the previously described embodiment only in the provisions for receiving the indexing member 22. As shown in FIGS. 7 and 8, transcriber apparatus having a front panel 80 includes an indexing dial 81 which includes a receptacle 82 recessed inwardly from the front panel 80 and of a diameter sufficient to receive an index member 22 of the type described previously herein. The index member driving face of the hub 23 projects into the receptacle 82 by an amount sufficient to enable driving engagement of the hub with an index member received within the receptacle. The hub 23 in the embodiment of FIGS. 7 and 8 is axially fixed in location, and so the apparatus depicted in FIGS. 2 and 3 for imparting axial movement to the hub need not be provided in the present embodiment.

A cover 83 made at least substantially of transparent material such as glass, plastic, or the like, and attached by a hinge connection 84 to the front panel 80, is movable to an open position as shown in FIG. 8 wherein an index member 22 can be disposed within the receptacle 82. The cover 83 is also movable to a closed position as shown in FIG. 7 wherein the index member 22 is retained in place behind the cover 83. A datum line 85 may be permanently marked on the transparent portion of the cover 83.

The embodiment depicted in FIGS. 7 and 8 has the marking devices 46 and 47 arranged behind the front panel 80 such that these marking devices are disposed at place index marks on an index member location above the hub 23. This is shown in FIG. 8 wherein apertures 90 and 91 are provided in the back wall of the receptacle 82 to permit selective passage of the tips 51 and 51*a*, respectively, associated with the marking devices 47 and 46. It will be apparent that the apertures 90 and 91 are disposed along a radial line coincident with the datum line 85.

Considering now the operation of the embodiment depicted in FIGS. 7 and 8, and index member 22 containing a preprinted time line 52, if desired, but bearing no marks or other indicia relating to the information or end signals previously dictated on a tape, is disposed within the receptacle 82. The receptacle cover 83 then is closed and the transcription apparatus is operated as aforementioned in a fast-rewind mode to return the dictated tape to a rewound condition to permit transcription of the dictated message to commence. The various information signals and end signals which were recorded on the tape by the dictator are sensed as aforementioned and cause the marking devices 46 and 47, operating through the apertures 90 and 91, to place corresponding marks upon the index member 22. Examples of these marks are shown on FIG. 7 at 65 and 66. The last end mark is made as the tape becomes completely rewound and the rewind phase of operation is terminated as aforementioned. This last or final end mark will lie beneath the datum line 85 because of the alignment between that line and the apertures 90 and 91, and so the person operating the transcription apparatus now has an index member 22 completely marked with end signal and information signal indicia and further which is properly aligned with respect to the datum 85, either to commence transcription of the messages recorded on the tape or, if desired, to place the transcription apparatus in a "fast-forward" mode to advance the tape to the location or locations corresponding with instructions as now noted on the index member 22.

It should be understood, of course, that the foregoing relates only to preferred embodiments of the present invention and that numerous modifications or alterations may be made therein without departing from the spirit and the scope of the invention as set forth in the appended claims.

I claim:

1. Apparatus for providing an indication of transcribed information contained on a recording medium of a predetermined length, comprising:

traversing means for receiving the recording medium and traversing the recording medium relative to a playback means, said playback means being operative to provide an event output signal in response to an event indicium signal recorded on the recording medium; and indication means operative in response to said output signal to provide an indication on an index means separate from the recording member and having length less than said predetermined length, with said indication corresponding to an event indicium signal on the recording medium.

2. Apparatus as in claim 1, wherein:

said indication means comprises index means operatively associated with said traversing means to move along a closed path separate from the path traversed by the recording medium; and marking means responsive to said event output signal and operatively disposed to impart to said index means a mark corresponding to an event indicium signal recorded on the recording medium.

3. Apparatus as in claim 2, wherein:
said index means is operative to move no more than one complete traverse along said closed path in response to a complete traverse of the recording medium.

4. Apparatus as in claim 3, wherein:
said index means comprises a generally circular member removably received for rotation along a circular path in response to traversal of the recording medium by said traversing means.

5. Apparatus as in claim 2, further comprising:
datum means disposed adjacent said index means to be selectively fixedly positionable along said closed path independent of the movement of said index means.

6. Apparatus as in claim 4, further comprising:
datum means disposed adjacent said circular index means in predetermined alignment with said marking means to be in registration with the point of application of marks imparted to said index means.

7. Apparatus for marking an index member in accordance with event indicia signal contained on a recording medium of first length in predetermined relation with dictated information contained on the recording medium, comprising:
traversing means for receiving the recording medium and for traversing the recording medium relative to a playback means, said playback means being operative to provide an event output signal in response to an event indicium on the recording medium;
index member receiving means for receiving an index member which has a second length less than said first length and which is separate from the recording medium;
marking means positioned in marking relation to an index member received in said index member receiving means and operatively connected to receive said event output signals, said marking means being operative in response to an event output signal to impart to such index member a mark corresponding to an event indicium signal recorded on the recording medium;
drive means operatively associated with said traversing means and connected to impart relative motion between an index member received in said index member receiving means and said marking means, said relative motion being a function of the traversing movement of the recording medium; and
datum means positioned adjacent said index member receiving means and providing a datum reference relative to an index member disposed in the index member receiving means.

8. Apparatus as in claim 7, wherein:
said datum means is selectively positionable independently of said drive means to dispose said datum reference at a desired location adjacent an index member disposed in said index member receiving means.

9. Apparatus as in claim 7, wherein:
said drive means is operative in response to said traversing movement of the recording medium to establish movement of an index member along a closed path; and
said marking means is operatively disposed adjacent said closed path to selectively apply said mark to an index member disposed in said index member receiving means for movement on said closed path.

10. Apparatus as in claim 9 wherein said datum means is selectively movable to position said datum reference at a selected location adjacent to said closed path of movement.

11. Apparatus as in claim 9 wherein:
said traversing means includes reverse motion means for traversing the recording medium relative to said playback means in a reverse direction relative to the direction in which the recording medium was moved to record information thereon;
said marking means being operative during said reverse traversing of the recording medium to selectively apply said marks on an index member disposed in said index member receiving means in response to output signals indicating event indicia recorded on the recording means.

12. Apparatus as in claim 9, wherein:
said playback means comprises first recorded signal responsive means operative to provide a first class of output signal in response to a first class of event indicium signal recorded on the recording medium and second recorded signal responsive means operative to provide a second class of output signal in response to a second class of event indicium signal recorded on the recording medium;
said indicating means including a first marking means operative in response to said first class of output signal to impart to an index member disposed in said index member receiving means a first class of mark corresponding to the occurrence of an event indicium signal of said first class; and
said indicating means additionally including a second marking means operative in response to said second class of output signal to impart to such index member a second class of mark corresponding to the occurrence of an event indicium of said second class.

13. Apparatus as in claim 12, wherein:
said first marking means is operatively disposed at a first location relative to said closed path to apply said first class of mark along a first predetermined path on such index member; and
said second marking means is operatively disposed at a second location relative to said closed path to apply said second class of mark along a second predetermined path on such index member.

14. Apparatus as in claim 13, wherein:
said drive means is operative to estabsh movement of an index member along a circular path;
said first marking means is operative to impart said first class of mark at a first radial distance relative to the center of said circular path; and
said second marking means is operative to impart said second class of mark at a second radial distance relative to the center of said circular path.

15. Apparatus for marking an index member to provide an indication corresponding to an event signal recorded on a recording medium in predetermined relation with audio signals recorded thereon, comprising:
first movement means for moving a recording medium along a first path relative to a playback means, said playback means being operative to provide an event output signal in response to an event signal recorded on the recording medium;

second movement means connected for operation by said first movement means and moving an index member along a second path separate from and shorter than said first path in response to the relative movement of the recording medium; and, marking means positioned along said second path and operative in response to said event output signal from said playback means to make an event mark on the index member.

16. Apparatus as in claim 15, wherein said playback means is a first playback means responsive to said event signals recorded on the recording medium, and further comprising second playback means positioned adjacent said first path and responsive to said audio signals recorded on the recording medium to provide an audio message signal.

* * * * *